(12) United States Patent
Jinbo et al.

(10) Patent No.: US 6,339,033 B2
(45) Date of Patent: Jan. 15, 2002

(54) SILICA GLASS HAVING SUPERIOR DURABILITY AGAINST EXCIMER LASER BEAMS AND METHOD FOR MANUFACTURING THE SAME

(75) Inventors: Hiroki Jinbo, Yokohama; Norio Komine; Seishi Fujiwara, both of Sagamihara; Akiko Yoshida, Kawasaki, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/736,279

(22) Filed: Dec. 15, 2000

Related U.S. Application Data

(62) Division of application No. 09/161,754, filed on Sep. 29, 1998, now Pat. No. 6,174,830.

(30) Foreign Application Priority Data

Dec. 8, 1997 (JP) .............................................. 9-336755

(51) Int. Cl.⁷ ................................................ C03C 3/06
(52) U.S. Cl. ............................. 501/54; 65/386; 65/392; 65/413; 65/425; 65/30.12; 65/30.1; 65/32.1
(58) Field of Search ............................... 501/54; 65/386, 65/392, 413, 425, 30.12, 30.1, 32.1

(56) References Cited

U.S. PATENT DOCUMENTS

| | | | |
|---|---|---|---|
| 5,086,352 A | 2/1992 | Yamagata et al. | ............. 65/900 |
| 5,325,230 A | 6/1994 | Yamagata et al. | ............. 65/900 |
| 5,326,729 A | 7/1994 | Yaba et al. | ..................... 501/54 |
| 5,410,428 A | 4/1995 | Yamagata et al. | ............. 501/53 |
| 5,523,266 A | 6/1996 | Nishimura et al. | ........... 501/54 |
| 5,668,067 A | 9/1997 | Araujo et al. | .................. 501/54 |
| 5,696,624 A | 12/1997 | Komine et al. | ............. 359/350 |
| 5,703,712 A | 12/1997 | Komine et al. | ............. 359/350 |
| 5,707,908 A | 1/1998 | Komine et al. | ............... 501/12 |
| 5,719,698 A | 2/1998 | Hiraiwa et al. | ............... 501/53 |
| 6,094,941 A * | 8/2000 | Fujinoki et al. | ............. 65/30.1 |
| 6,143,676 A * | 11/2000 | Ohashi et al. | ................ 501/54 |

FOREIGN PATENT DOCUMENTS

| | | |
|---|---|---|
| EP | 0 401 845 | 12/1990 |
| EP | 0 483 752 | 5/1992 |
| EP | 0 636 586 | 2/1995 |
| EP | 0 720 969 | 7/1996 |
| EP | 0 737 654 | 10/1996 |
| EP | 0 870 737 | 10/1998 |
| WO | WO 97/16382 | 5/1997 |

* cited by examiner

*Primary Examiner*—Karl Group
(74) *Attorney, Agent, or Firm*—Morgan, Lewis & Bockius LLP

(57) ABSTRACT

A silica glass is provided for use in an optical system processing an excimer laser beam. The silica glass has a molecular hydrogen concentration of about $5 \times 10^{18}$ molecules/cm³ or less and is substantially free from defects which become precursors susceptible to an one-photon absorption process and a two-photon absorption process upon irradiation of the excimer laser beam to the silica glass.

17 Claims, 1 Drawing Sheet

SILICA GLASS HAVING SUPERIOR DURABILITY AGAINST EXCIMER LASER BEAMS AND METHOD FOR MANUFACTURING THE SAME

CROSS-REFERENCE TO RELATED APPLICATIONS

This application is a divisional application of commonly assigned copending application Ser. No. 09/161,754, filed on Sep. 29, 1998, now U.S. Pat. No. 6,174,830 entitled "SILICA GLASS HAVING SUPERIOR DURABILITY AGAINST EXCIMER LASER BEAMS AND METHOD FOR MANUFACTURING THE SAME," which is also incorporated herein by reference. This application claims the benefit of Japanese Application No.09-336755, filed in Japan on Dec. 8, 1997, which is hereby incorporated by reference. This application also incorporates by reference Japanese Application No. 09-083152, filed in Japan on Apr. 1, 1997.

BACKGROUND OF THE INVENTION

1. Field of the Invention

The present invention relates to silica glass for use in optical systems, such as lenses and mirrors, for photolithography using the wavelength ranges of 400 nm or less and of 300 nm or less, and a method of manufacturing such a silica glass.

2. Discussion of the Related Art

In recent years, VLSI chips have been highly integrated and configured to have numerous functions. In the field of logic VLSI, a so-called "system on-chip" scheme, in which a larger system is incorporated on one chip, is becoming more and more popular. Accordingly, finer pattern manufacture and higher integration are required on the silicon wafer or like substrate of such a "system on-chip" scheme. An exposure apparatus, called a stepper, or the like has been used in the photolithography technique for exposing and transcribing a fine pattern of integrated circuits onto a wafer made of silicon or the like.

In the case of DRAMs, as technology develops from LSI to VLSI, the capacity increases from 1M→4M→16M→64M→256M→1G. Accordingly, the minimum line width to be produced by photolithography apparatus should be increased from 1 $\mu$m→0.8 $\mu$m→0.5 $\mu$m→0.35 $\mu$m→0.25 $\mu$m→0.18 $\mu$m.

To cope with such a trend, a higher resolution and a deeper focal depth are required for the projection lens of the stepper. The resolution and focal depth are determined by the wavelength $\lambda$ of exposure light and the numerical aperture (N.A.) of the lenses.

The finer the pattern, the larger the angle of the diffraction light. Therefore, the diffraction light can not be processed unless the lens has a large N.A. Also, the shorter the wavelength $\lambda$ of exposing light, the smaller the angle of the diffraction light. Thus, with a shorter wavelength, a relatively smaller N.A. is acceptable.

The resolution and the focal depth are expressed by,

Resolution=k1·$\lambda$/N.A.

Focal Depth=k2·$\lambda$/(N.A.)$^2$ (where, k2 and k2 are proportional constants)

According to these formulae, in order to improve the resolution, either N.A. needs to be increased, or $\lambda$ needs to be shortened. However, as shown in the above formula, shortening $\lambda$ is preferable in terms of the focal depth. Therefore, the wavelength of exposing light has been reduced from the g-line (436 nm) to the i-line (365 nm), and further to excimer laser beams of KrF (248 nm) and ArF (193 nm).

Also, the optical system installed in the stepper is constructed of a plurality of optical members such as lenses. Therefore, even if the transmittance loss at each lens is small, the cumulative effects of all the lenses may lead to decrease in light amount received at the illumination surface. Thus, very high transmittance is required for each of the optical member.

Therefore, for the wavelength band of 400 nm or less, optical glass, which is manufactured by a special method taking into account transmittance loss arising from a combination of optical members, is used. For the wavelength of 300 nm or less, synthesized silica glass or single crystal fluoride, such as $CaF_2$, is used.

As described above, one of the properties of optical members for a photolithography technique that causes deterioration in the image contrast is a transmission loss. The transmission loss is mainly caused by light absorption and light scattering in the optical member.

The light absorption is a phenomenon caused by electron transition due to photon energy incident on the optical member. When the light absorption occurs in the optical member, the absorbed energy is converted to thermal energy. As a result, the volume of the optical member increases and the refractive index and the surface condition change accordingly. In this case, the desired resolution can not be obtained.

With regard to silica glass, in particular, the synthesized silica glass manufactured by the oxy-hydrogen flame hydrolysis method using $SiCl_4$ as a material, there is very small amount of impurity metal. Accordingly, such a glass has superior transmittance with respect to ultraviolet light.

In general, the desired specification for the transmittance of silica glass used for the optical system of precision instruments, such as photolithography-use projection lenses and illumination lenses, is about 0.1%/cm or less in terms of the bulk absorption.

Accordingly, deterioration in the transmittance, which may occur over a short or long period of time (referred to as "solarization"), is required to be within about 0.1%/cm or less.

In the silica glass, especially when it is irradiated by an ArF excimer laser beam, various color centers, such as "≡Si·" (the E' center) and "≡Si—O·" (NBOHC), are generated through two-photon processes from defect precursors (≡Si—Si≡, ≡Si—O—O—Si≡) and $SiO_2$ primary structure (≡Si—O—Si≡). Such color centers cause deterioration in the transmittance for the wavelength range in use. To deal with such two-photon absorption, increasing of molecular hydrogen concentration in the glass has been proposed in order to improve the durability against laser irradiation of the silica glass.

However, even when such a conventional silica glass, which suppresses two-photon absorption processes, is used for constructing an exposure apparatus, sufficient focusing properties and adequately high enough throughput have not been achieved.

SUMMARY OF THE INVENTION

Accordingly, the present invention is directed to a silica glass having superior durability against ultraviolet light and a method for manufacturing the same that substantially obviate the problems due to limitations and disadvantages of the related art.

An object of the present invention is to provide a silica glass having sufficient focusing properties and throughput without the disadvantages of the conventional art, and a method of manufacturing the same.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a silica glass for use in an optical system for processing an excimer laser beam, the silica glass having a molecular hydrogen concentration of about $5 \times 10^{18}$ molecules/cm$^3$ or less and being substantially free from defects which become precursors susceptible to a one-photon absorption process and a two-photon absorption process upon irradiation of the excimer laser beam to the silica glass.

In another aspect, the present invention provides a silica glass having a molecular hydrogen concentration of about $5 \times 10^{18}$ molecules/cm$^3$ or less to substantially suppress defects which become color centers through a one-photon absorption process upon irradiation of an excimer laser beam, the molecular hydrogen concentration being greater than an amount that is necessary to substantially suppress defects which become color centers through a two-photon absorption process upon irradiation of the excimer laser beam.

In a further aspect, the present invention provides a method for manufacturing a silica glass for use in optical system for processing an excimer laser beam, the method including the steps of maintaining a silica glass having a molecular hydrogen concentration of more than about $5 \times 10^{18}$ molecules/cm$^3$ at a temperature of about 1000° C. or more for about 10 hours or more; thereafter cooling the silica glass to a temperature less than 1000° C. in a controlled cooling manner; and thereafter leaving the silica glass in an atmospheric condition to cool the silica glass to a room temperature.

It is to be understood that both the foregoing general description and the following detailed description are exemplary and explanatory and are intended to provide further explanation of the invention as claimed.

BRIEF DESCRIPTION OF THE DRAWING

The accompanying drawing, which is included to provide a further understanding of the invention and is incorporated in and constitute a part of this specification, illustrates embodiments of the invention and together with the description serves to explain the principles of the invention.

In the drawing.

DETAILED DESCRIPTION OF PREFERRED EMBODIMENTS

Figure 1:
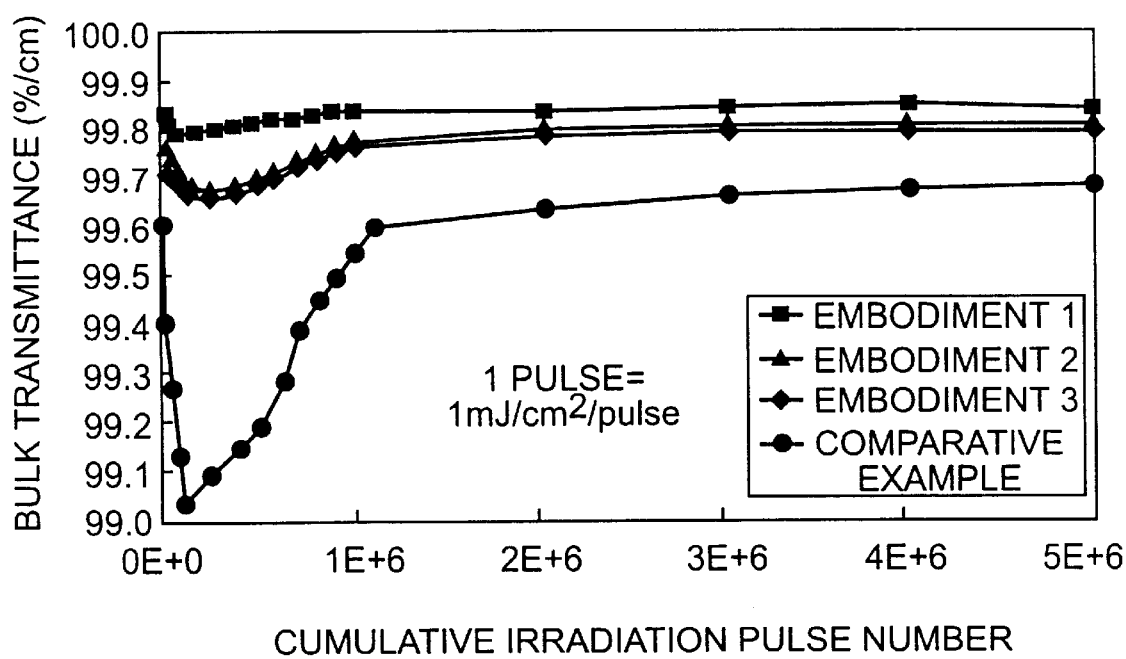
FIG. 1 shows that transmittance changes due to ArF excimer laser irradiation in the silica glass samples of preferred embodiments of the present invention and a comparative example.

The inventors of the present invention conducted diligent research on the properties of silica glass under irradiation of ArF excimer laser beams. The following are examples of findings of the research.

(1) Silica glass manufactured under hydrogen rich conditions, i.e., silica glass having a molecular hydrogen concentration of more than about $5 \times 10^{18}$ (molecules/cm$^3$), is likely to generate color centers (absorption) therein through one-photon processes. A conventional thermal treatment can not suppress generation of such absorption centers completely.

(2) It is possible to reduce or suppress the absorption (color centers) created by the one-photon processes by conducting annealing for a much longer time than that sufficient for the conventional anneal process and producing a molecular hydrogen concentration of about $5 \times 10^{18}$ (molecules/cm$^3$) or less.

In other words, the present inventors have discovered that the conventional silica glass manufactured under the hydrogen rich conditions for the purpose of reducing the two-photon absorption (color center formed by two-photon processes) and accordingly having a higher molecular hydrogen concentration is likely to generate E'-centers ($\equiv$Si·) therein, which are considered to be generated by unstable $\equiv$Si—H structures through one-photon processes. This means that such silica glass, as manufactured under the hydrogen rich conditions in order to reduce defects formed through two-photon absorption processes, instead has defect precursors which become new color centers through one-photon absorption; i.e., the color centers can be generated through weaker energy optical-excitation.

In view of the foregoing, the present invention provide a silica glass member having a molecular hydrogen concentration of about $5 \times 10^{18}$ (molecules/cm$^3$) or less and being essentially free from defects which become precursors susceptible to one-photon and two-photon absorption processes under irradiation with excimer laser beams.

The present invention also provides a method for manufacturing such a silica glass member, including the steps of maintaining a silica glass having molecular hydrogen concentration of $5 \times 10^{18}$ (molecules/cm$^3$) or more at 1000° C. or more for 10 hours or more, cooling the silica glass to 500° C. at a cooling rate of 10° C./hr or less, and leaving the silica glass in the atmospheric condition to cool it down.

First, classification between the "one-photon absorption process" and the "two-photon absorption process," which occur when silica glass is irradiated with excimer laser beams, are explained. The classification is determined by the energy density dependency; if the amount of the absorption is proportional to the energy density of the incident laser beam, the process is a one-photon process; if it is proportional to the square of the energy density, then it is a two-photon process.

The one-photon absorption reaches its maximum effect when the silica glass is irradiated with about $10^5$ of high energy pulses each having an energy density of 50–400 mJ/cm$^2$/pulse, and gradually photo-bleaches (the absorption decreases with the irradiation). Because of this, the one-photon absorption process has not been recognized in the past, and the conventional silica glass manufacture method using the hydrogen rich conditions has been considered to be sufficient for improving the durability against excimer laser beams.

It may be considered that this absorption process is not problem because they disappears by the photo-bleach effect under high energy irradiation of 50–400 mJ/cm$^2$/pulse. However, this is not the case for photolithography apparatus. In actual photolithography apparatus, the energy density of the ArF excimer laser irradiating each projection liens is about 1 mJ/cm$^2$/pulse or less at most parts of the lens. Accordingly, if silica glass having a large number of the one-photon absorption precursors is used in the apparatus, the absorption occurs (color centers are generated) immediately after the initial operation of the apparatus, which leads to considerable degradation in the image focusing properties and the throughput.

According to the present invention, it becomes possible to provide a silica glass having a superior and stable transmittance at 193.4 nm for short time as well as for long time application, by reducing defect precursors which would become color centers, such as E'-centers, through one-photon processes upon initial irradiation of excimer laser.

In the present invention, manufacture conditions and heat treatment conditions for silica glass are optimized so as to reduce seeds of structural defects which may be generated through one-photon transition processes in the silica glass. The thermal treatment preferably is conducted for a long time but not so long as to affect the yield. For example, a silica glass is maintained at 1000° C. or more for 10 hours or more, is cooled to 500° C. at a cooling rate of 10° C./hr or less, and is left in an atmospheric condition to further cool it down. Since the temperature of the last step may affect generation of defects, an additional cooling step from 500° C. to 200° C. may preferably be provided before the last step.

Reference will now be made in detail to the preferred embodiments of the present invention, examples of which are illustrated in the accompanying drawing.

First Working Example (First Preferred Embodiment)

A silica glass was manufactured by an oxy-hydrogen flame hydrolysis method using $SiCl_4$ as a material with the ratio of oxygen gas to hydrogen gas being 0.44. The dimensions of the resulting silica glass ingot were φ300×t800 mm. A member having the dimensions of φ200×t50 was cut out from the ingot and maintained at 1000° C. for 10 hours, was cooled to 800° at a cooling rate of 1° C./hr, was cooled to 200° C. at a cooling rate of 10° C./hr, and was left in the atmospheric condition to further cool it down to the room temperature.

The reason why the cooling rate was changed at 800° C. is that the causes of one-photon absorption can be effectively reduced at around 800° C. to 1000° C. without deteriorating other properties of the silica glass.

After the treatments, evaluation samples having the dimensions of φ60×t10 mm were cut out from the member, and were subjected to fine grinding and fine cleaning. The resulting samples were irradiated with ArF excimer laser beams and the absorption properties were measured.

Before the ArF excimer laser irradiation, the transmittance including reflection losses at 193.4 nm was about 90.7%/cm. The theoretical transmittance, which is a transmittance including only reflection losses without absorption and scattering losses, was 90.87% /cm and the bulk scattering was about 0.1 5%/cm. Accordingly, the bulk absorption was estimated to be about 0.02%/cm or less.

The molecular hydrogen concentration in the silica glass was measured by the laser Raman spectroscopy method, which yielded about $2\times10^{18}$ molecules/$cm^3$. In general, hydrogen molecules arc expelled from a thin surface portion of the samples (a region with the thickness of about 10 mm from the surface). Therefore, silica glass products to be annealed need to be thicker than the target products by at least 10 mm or more in their surface region. Also, it is possible to reduce such hydrogen gas expelling phenomena by annealing it under a hydrogen atmosphere. However, anneal at 800° C. or more tinder a hydrogen atmosphere may generate reduction seeds on the surface or promote diffusion of impurities, such as Na. Thus, it is preferable to anneal the products under an inert gas atmosphere at the temperature of about 800° C. or more and to change to a hydrogen atmosphere at the temperature of about 800° or less. However, since hydrogen stops diffusing into the glass due to its low diffusion coefficient under 300° C., the temperature of the hydrogen atmosphere thermal treatment needs to be more than 300° C.

The above samples were irradiated with an ArF excimer laser beam and the absorption properties were studied. The irradiation conditions were: the energy density, 1 $mJ/cm^2$/pulse; the frequency, 100 Hz; and the number of pulses, up to about $5\times10^6$ pulses. FIG. 1 shows measured transmittance changes with ArF excimer laser irradiation. As shown in FIG. 1, the absorption induced by the one-photon process due to the irradiation was 0.05% or less, which is a sufficiently small value. Such a silica glass is suitable for photolithography-use optical members because the total transmittance loss of an optical system having multiple optical members can be made sufficiently small and the desired resolution and the throughput can be obtained. In general, the bulk absorption of each optical member for projection and illumination optical systems is preferably about 0.2% or less.

Similar results were obtained for synthesized silica glass manufactured using HMDS (hexamethyldisiloxane) as a material. In this case, since organic silica compound like HMDS does not include Cl, the synthesized silica glass is essentially free from the ≡Si—Cl structure. Therefore, an absorption band at 215 nm due to SiE' generated by two-photon absorption processes can be suppressed and such a silica glass is expected to have a superior long time durability.

Second Working Example (Second Preferred Embodiment)

A silica glass was manufactured by an oxy-hydrogen flame hydrolysis method using $SiCl_4$ as a material with the ratio of oxygen gas to hydrogen gas being 0.6. The dimensions of the resulting silica glass ingot were φ300×t800 mm. A member having the dimensions of φ200×t50 was cut out from the ingot and maintained at 1000° C. for 10 hours, was cooled to 800° at a cooling rate of 1° C./hr, was cooled to 500° C. at a cooling rate of 10° C./hr, and was left in the atmospheric condition to further cool it down to the room temperature.

The reason why the cooling rate was changed at 800° C. is that the causes of one-photon absorption can be effectively reduced at around 800° C. to 1000° C. without deteriorating other properties of the silica glass.

After the treatments, evaluation samples having the dimensions of φ60×t10 mm were cut out from the member, and were subjected to fine grinding and fine cleaning. The resulting samples were irradiated with ArF excimer laser beams and the absorption properties were measured.

Before the ArF excimer laser irradiation, the transmittance including reflection losses at 1 93.4 nm was about 90.7%/cm. The theoretical transmittance, which is a transmittance including only reflection losses without absorption and scattering losses, was 90.87%/cm and the bulk scattering was about 0.15%/cm. Accordingly, the bulk absorption was estimated to be about 0.02%/cm or less.

The above samples were irradiated with an ArF excimer laser beam and the absorption properties were studied. The irradiation conditions were: the energy density, 1 $mJ/cm^2$/pulse; the frequency, 100 Hz; and the number of pulses, up to about $5\times10^6$ pulses. FIG. 1 shows measured transmittance changes with ArF excimer laser irradiation. As shown in FIG. 1, the absorption induced by the one-photon process due to the irradiation was 0.1% or less, which is a sufficiently small value. Such a silica glass is suitable for photolithography-use optical members because the total transmittance loss of an optical system having multiple optical members can be made sufficiently small and the desired resolution and the throughput can be obtained. In general, the bulk absorption of each optical member for projection and illumination optical systems is preferably about 0.2% or less.

Third Working Example (Third Preferred Embodiment)

A silica glass was manufactured by an oxy-hydrogen flame hydrolysis method using $SiCl_4$ as a material with the ratio of oxygen gas to hydrogen gas being 0.44. The dimensions of the resulting silica glass ingot were $\phi300\times t800$ mm. A member having the dimensions of $\phi200\times t50$ was cut out from the ingot and maintained at 1000° C. for 10 hours, was cooled to 500° at a cooling rate of 10° C./hr, and was left in the atmospheric condition to further cool it down to the room temperature.

After the treatments, evaluation samples having the dimensions of $\phi60\times t10$ mm were cut out from the member, and were subjected to fine grinding and fine cleaning. The resulting samples were irradiated with ArF excimer laser beams and the absorption properties were measured.

Before the ArF excimer laser irradiation, the transmittance including reflection losses at 193.4 nm was about 90.7%/cm. The theoretical transmittance, which is a transmittance including only reflection losses without absorption and scattering losses, was 90.87%/cm and the bulk scattering was about 0.15%/cm. Accordingly, the bulk absorption was estimated to be about 0.02%/cm or less.

The above samples were irradiated with an ArF excimer laser beam and the absorption properties were studied. The irradiation conditions were: the energy density, 1 $mJ/cm^2$/pulse; the frequency, 100 Hz; and the number of pulses, up to about $5\times10^6$ pulses. FIG. 1 shows measured transmittance changes with ArF excimer laser irradiation. As shown in FIG. 1, the absorption induced by the one-photon process due to the irradiation was 0.1% or less, which is a sufficiently small value. Such a silica glass is suitable for photolithography-use optical members because the total transmittance loss of an optical system having multiple optical members can be made sufficiently small and the desired resolution and the throughput can be obtained. In general, the bulk absorption of each optical member for projection and illumination optical systems is preferably about 0.2% or less.

Comparative Example

A silica glass was manufactured by an oxy-hydrogen flame hydrolysis method using $SiCl_4$ as a material with the ratio of oxygen gas to hydrogen gas being 0.8. The dimensions of the resulting silica glass ingot were $\phi300\times t800$ mm. A member having the dimensions of $\phi200\times t50$ was cut out from the ingot and maintained at 1000° C. for 10 hours, was cooled to 500° at a cooling rate of 20° C./hr, and was left in the atmospheric condition to further cool it down to the room temperature.

After the treatments, evaluation samples having the dimensions of $\phi60\times t10$ mm were cut out from the member, and were subjected to fine grinding and fine cleaning. The resulting samples were irradiated with ArF excimer laser beams and the absorption properties were measured.

Before the ArF excimer laser irradiation, the transmittance including reflection losses at 193.4 nm was about 90.7%/cm. The theoretical transmittance, which is a transmittance including only reflection losses without absorption and scattering losses, was 90.87%/cm and the bulk scattering was about 0.15%/cm. Accordingly, the bulk absorption was estimated to be about 0.02%/cm or less.

The above samples were irradiated with an ArF excimer laser beam and the absorption properties were studied. The irradiation conditions were: the energy density, 1 $mJ/cm^2$/pulse; the frequency, 100 Hz; and the number of pulses, up to about $5\times10^6$ pulses. FIG. 1 shows measured transmittance changes with ArF excimer laser irradiation. As shown in FIG. 1, the absorption induced by the one-photon process due to the irradiation was 1% or less, which is too large. Such a silica glass is not suitable for photolithography-use optical members because the total transmittance loss of an optical system having multiple optical members cannot be made sufficiently small and the desired resolution and the throughput cannot be obtained. In general, the bulk absorption of each optical member for projection and illumination optical systems is preferably about 0.2% or less.

According to the present invention, it becomes possible to provide lens members which are free from one-photon absorption effects caused by ArF excimer laser irradiation and have a sufficient and stable transmittance at 193.4 nm.

It will be apparent to those skilled in the art that various modifications and variations can be made in a silica glass having superior durability against ultraviolet light and a method for manufacturing the same of the present invention without departing from the spirit or scope of the invention. Thus, it is intended that the present invention cover the modifications and variations of this invention provided they come within the scope of the appended claims and their equivalents.

What is claimed is:

1. A method for manufacturing a silica glass for use in optical system for processing an excimer laser beam, the method comprising the steps of:

maintaining a silica glass having a molecular hydrogen concentration of not more than about $5\times10^{18}$ molecules/$cm^3$ at a temperature of about 1000° C. or more for about 10 hours or more;

thereafter cooling the silica glass to a temperature less than 1000° C. in a controlled cooling manner; and thereafter leaving the silica glass in an atmospheric condition to cool the silica glass to a room temperature.

2. The method according to claim 1, wherein the step of cooling the silica glass in the controlled cooling manner includes the step of cooling the silica glass to about 500° C. at a cooling rate less than 20° C./hr.

3. The method according to claim 2, wherein the cooling rate in the step of cooling the silica glass to about 500° C. is about 10° C./hr or less.

4. The method according to claim 1, wherein the step of cooling includes the steps of:

cooling the silica glass to a temperature between about 500° C. and about 700° C. at a cooling rate of about 10° C./hr or less; and thereafter cooling the silica glass to about 200° C. or less at a cooling rate of about 10° C./hr or more.

5. The method according to claim 1, wherein the step of maintaining includes the step of maintaining the silica glass under at least one of atmospheric condition and inert gas atmosphere, and wherein the step of cooling includes the steps of:

cooling the silica glass to about 800° C. or less at a cooling rate of about 10° C./hr or less;

changing the at least one of the atmospheric condition and the inert gas atmosphere to hydrogen gas atmosphere at a temperature between about 300° C. and about 800° C. to prevent hydrogen from being expelled from the silica glass and to maintain uniform hydrogen profile in the silica glass; and cooling the silica glass to about 500° C. or less in a controlled cooling manner.

6. The method according to claim 1, wherein the excimer laser beam includes an ArF excimer laser beam.

7. The method according to claim 1, wherein the step of cooling the silica glass in the controlled cooling manner includes the step of cooling the silica glass to about 800° C. at a cooling rate of about 10° C./hr or less.

8. The method according to claim 7, wherein the step of cooling the silica glass in the controlled cooling manner further includes the step of further cooling the silica glass cooled to about 800° C. to about 500° C. at a cooling rate of about 10° C./hr or less.

9. The method according to claim 7, wherein the step of cooling the silica glass in the controlled cooling manner further includes the step of further cooling the silica glass cooled to about 500° C. to about 200° C. at a cooling rate of about 10° C./hr or more.

10. The method according to claim 7, wherein the cooling rate in the step of cooling the silica glass to about 800° C. is about 1° C./hr or less.

11. The method according to claim 1, wherein the step of maintaining includes the step of maintaining the silica glass under at least one of atmospheric condition and inert gas atmosphere, and wherein the step of cooling includes the step of changing the at least one of the atmospheric condition and the inert gas atmosphere to hydrogen atmosphere at a temperature between about 300° C. and about 800° C.

12. The method according to claim 1, further including the step of synthesizing the silica glass having the molecular hydrogen concentration of more than about $5\times10^{18}$ molecules/cm$^3$ before the step of maintaining.

13. The method according to claim 12, wherein the step of synthesizing includes synthesizing the silica glass by an oxy-hydrogen flame hydrolysis method using $SiCl_4$ as a material.

14. The method according to claim 12, wherein the step of synthesizing includes synthesizing the silica glass using HMDS (hexamethyldisiloxane) as a material.

15. The method according to claim 1, wherein the steps of maintaining, cooling, and leaving are conducted such that the resulting silica glass has a molecular hydrogen concentration between about $2\times10^{18}$ molecules/cm$^3$ and about $5\times10^{18}$ molecules/cm$^3$.

16. The method according to claim 1, wherein the steps of maintaining, cooling, and leaving are conducted such that the resulting silica glass has a bulk absorption of about 0.2%/cm or less.

17. The method according to claim 1, wherein the steps of maintaining, cooling, and leaving are conducted such that the resulting silica glass has a molecular hydrogen concentration of about $5\times10^{18}$ molecules/cm$^3$ or less and is substantially free from defects which become color centers through a one-photon absorption process upon irradiation of the excimer laser beam.

* * * * *